United States Patent [19]

Nishimura

[11] 4,274,771

[45] Jun. 23, 1981

[54] BORING REAMER WITH END MILL CUTTERS

[75] Inventor: Takayuki Nishimura, Nara, Japan

[73] Assignee: G. N. Tool Inc., Nara, Japan

[21] Appl. No.: 52,840

[22] Filed: Jun. 28, 1979

[51] Int. Cl.³ .......................... B23B 51/00; B26D 1/12
[52] U.S. Cl. ....................................... 408/230; 407/53;
407/61; 408/221; 408/224
[58] Field of Search ............... 408/219, 220, 221, 222,
408/223, 224, 225, 226, 227, 228, 229, 230;
407/53, 54, 55, 56, 57, 58, 59, 60, 61, 62, 63

[56] References Cited

U.S. PATENT DOCUMENTS

| 112,115 | 2/1871 | Boyden | 408/230 |
|---|---|---|---|
| 262,885 | 8/1882 | Babcock | 408/223 |
| 362,934 | 5/1887 | Champion | 408/224 |
| 1,490,069 | 4/1924 | Gammons | 408/223 |
| 1,490,069 | 4/1924 | Gammons | 408/230 |
| 1,603,739 | 10/1926 | Borgeson | 408/229 |
| 2,297,611 | 9/1942 | Drummond | 407/62 |
| 2,377,329 | 6/1945 | Dettmer | 407/53 |
| 2,479,136 | 8/1949 | Schade | 408/223 |
| 3,863,316 | 2/1975 | Yeo | 408/230 |
| 3,977,807 | 8/1976 | Siddall | 408/223 |

FOREIGN PATENT DOCUMENTS 1265064  3/1972  United Kingdom ..................... 408/227

*Primary Examiner*—Harrison L. Hinson
*Attorney, Agent, or Firm*—Koda and Androlia

[57] ABSTRACT

A boring reamer with end mill cutters comprising a cutting edge portion, a straight shank and a taper shank. The cutting edge portion is formed at the forward edge of the straight shank, and has, at its forward end, end mill cutters each of which is formed with a chamfer angle portion and a relieving angle portion, and has a reamer, which is slightly larger in the diameter than the end mill cutters and provided with an ultra-left-hand twist right-hand helix angle, and which is formed into a saw-tooth like configuration having a land portion.

1 Claim, 4 Drawing Figures

4,274,771

BORING REAMER WITH END MILL CUTTERS

BACKGROUND OF THE INVENTION

1. Field of the Invention

This invention relates to a cutting tool and more particularly to a boring reamer with end mill cutters.

2. Prior Art

In the prior art there existed several types of boring reamer with end mill cutters. However, none of them has ever been successfully perfect in reaming any holes correctly, precisely and neatly even with a large reaming load in an efficient manner regardless of the state of the drilled holes, and been superior in abrasion resistance with a long life, while been capable of effecting processing free from troubles arising from cuttings of swarf by pushing such swarf forward.

SUMMARY OF THE INVENTION

Accordingly, it is the primary object of this invention to provide a boring reamer with end mill cutters which is capable of correctly, precisely and neatly reaming any holes even with a large reaming load in an efficient manner regardless of the state of the drilled holes, and which is superior in abrasion resistance with a long life, while being also free from troubles arising from cutting of swarf by pushing such swarf forward.

The boring reamer with end mill cutters comprises a cutting edge portion 1, a straight shank 2 and a taper shank 3. The cutting edge portion 1 including a plurality of flutes has, at its forward end, end mill cutters 4 formed with straight flutes, and at the portion subsequent to the forward end, a reamer 5 slightly larger in diameter than the end mill cutter 4 and provided with an ultra-left-hand twist right-hand cut fluted cutting edge with a helix angle of about 50°–70°.

The straight shank 2 having said cutting edges 1 at its forward end is also provided with lubrication grooves 11 for feeding the lubrication oil to the cutting edges 1.

BRIEF DESCRIPTION OF THE DRAWINGS

The principles and objects of the present invention will become more apparant in the below description in conjunction with the following drawings.

DESCRIPTION OF THE PREFERRED EMBODIMENT

Figure 1:
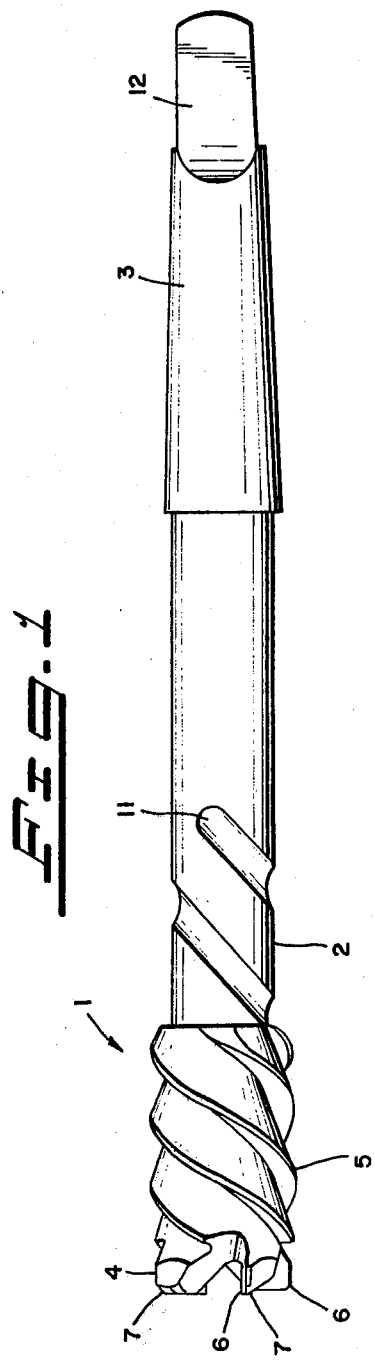
FIG. 1 is a front view of an embodiment of the above-mentioned boring reamer with end mill cutters.
Figure 4:
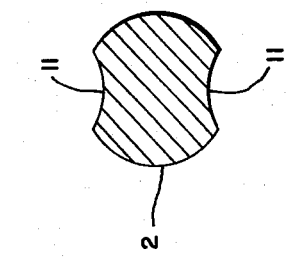
FIG. 4 is an end view of the straight bank.
Figure 3:
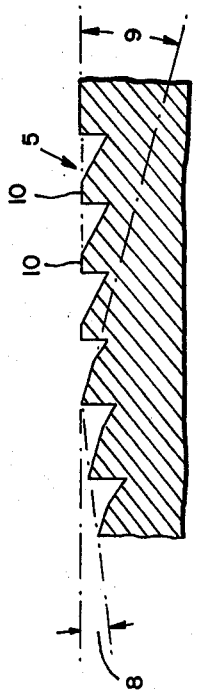
FIG. 3 is a fragmentary sectional view of the cutting edge portion.
Figure 2:
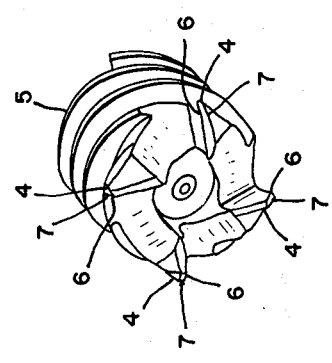
FIG. 2 is a perspective view of end mill cutters.

The present invention comprises:

a cutting edge portion 1, a straight shank 2 and a taper shank 3. The cutting edge portion 1 including a plurality of flutes has at its forward end, an end mill cutter 4 formed with straight flutes, and at the portion subsequent to the forward end, a reamer 5 slightly larger in the diameter than the end mill cutter 4 and provided with an ultra-left-hand twist right-hand cut fluted cutting edge with a helix angle of about 50°–70°. The length of the end mill cutter 4 at the cutting edge portion 1 should preferably be approximately ¼ to 1/5 of the length of the cutting edge of the reamer 5. Each end mill cutter 4 is formed with a chamfer angle portion 6 at an angle less than approximately 45° with respect to the end face and relieving angle portion 7 of about 5° to 10°, and moreover, the reamer 5 is also provided with a chamfer angle 8 of about 30°–20° and a relieving angle 9 of approximately 1°–10°, and is formed into a sawtooth like configuration having a land portion 10 of 0.1–0.5 mm in width for expediting the burnishing effect.

The straight shank 2 having said cutting edges 1 at its forward end is also provided with lubrication grooves 11 for feeding the lubrication oil to the cutting edges 1. It is preferable that the lubrication oil grooves 11, for example, of concave and approximately semi-circular cross section should have a left-hand helix angle of about 15°–30°, and be formed to have the same number of flutes as that of the cutting edges 1, with the number of the grooves being arranged to be increased as the diameter of the reamer 5 increases.

It is to be noted here that the lubrication oil grooves 11 are required for supplying the lubrication oil during formation of horizontal holes, and in the case of forming vertical holes, the lubrication oil may be fed without particulary providing said grooves 11. Therefore, the lubrication oil grooves 11 should be provides depending on the state of the applications.

The boring reamer further includes a mounting portion or tongue 12 formed at an end of the taper shank 3, and in a manner similar to that in the general reaming work, the tongue 12 is held by a suitable holder for rotation so that the end mill cutters 4 and the reamer 5 successively cut into holes in the workpieces (not shown) so as to form the holes into the required configuration.

It should be noted here that the shapes of the taper shank 3 and tongue 12 may be modified into various ways depending on necessity and for example, the straight shank 2 may be further extended rewardly so as to replace the taper shank 3 and tongue 12.

More specifically, the boring reamer with the end mill cutter having the construction as described above cuts off the wall surface of the drilled hole which is drilled, patched or bored in a comparatively large amount (about 2–5 mm) by the end mill cutters 4 with straight cutting edges provided at the formed end thereof. Subsequently, cutting to the extent of about 0.1–0.3 mm is effected by the reamer 5, with simultaneous burnishing by the land portion 10.

On the other hand, the cutting edge portion 1 should preferably be integrally formed by a carbide alloy as one unit so as to be unreleasably fixed to the forward end of the straight shank 2.

In the device according to the present invention having the construction as described above, the rough processing is first made by the end milling cutters 4 for subsequent cutting by the reamer 5, and since the cutting edges of the reamer 5 twisted leftward by about 50°–65° have chamfer portion and edge length larger than those of the straight cutting edges, each of the cutting edges thereof contacts the inner wall at a large area, and therefore, desirable roundness and cylindrical shape are readily available for correct, precise and beautiful reaming processing at a high efficiency, while the boring reamer has a long life with superior resistance against abrasion, since the reamer 5 is not subjected to large loads. Furthermore, the left-hand twist right-hand edges are effective for smoothly driving forward both the lubrication oil and swarf, and thus, no cuttings or swarf are collected in the grooves, with substantial elimination of disadvantages such that the finished surface is spoiled due to collected swarf or the reamer 5 is damaged through adhesion thereof to the inner wall of the hole, etc. As is clear from the foregoing description, the boring reamer with the end mill cutters according to the present invention is particularly superior in practical application.

I claim:

1. A boring reamer having a cutting portion comprising:

at its forward end, a end mill cutter portion formed with straight flutes; and to the rear of said end mill cutter portion a fluted member portion larger in diameter compared to said end mill cutter portion and from four to five times as long, said fluted reamer portion being provided with an ultra-left-hand twist right-hand cut fluted cutting edge with a helix angle of about 50°–70°, the forward portion of said fluted reamer cutting edge having a chamfer angle of about 30°–20° and relieving angle of approximately 1°–10° and the rear portion of said fluted reamer cutting edge having a plurality of unrelieved burnishing portions each of from 0.1–0.5 mm in width.

* * * * *